3,226,213
FUEL GAS COMPOSITION
Rodney A. Nelson and Robert W. Belfit, Jr., Midland, Mich., assignors to The Dow Chemical Company, Midland, Mich., a corporation of Delaware
No Drawing. Filed Nov. 23, 1962, Ser. No. 239,828
19 Claims. (Cl. 48—197)

This invention relates to a composition of matter useful as a fuel gas, and more particularly to a composition which is safely storable under pressure, has relatively constant composition upon withdrawal from storage, and is particularly useful in welding or torch cutting operations.

It is desirable that fuel gas to be used in welding or flame cutting operations be stored under pressure so as to store a maximum amount of fuel in a minimum space. Desirably, sufficient pressure is used so that the gas is liquified, as is the common practice in conventional gas cylinders. Prior experience has shown that the composition of both the gas and the liquid phases stored in a container under pressure varies as gas is withdrawn. A relatively constant gas phase composition is desirable to provide a constant flame temperature in order that welding, cutting, or the like techniques may be consistent over the full period of gas withdrawal from the storage container. Pure, single component gas would have these characteristics, but other problems arise.

Many gaseous materials suitable for fule are explosive in relatively high concentrations. Therefore, in storage, the primary fuel may be dissolved in a liquid or dispersed in a packing medium to stabilize it, or may be diluted with other materials. The latter method is to be preferred because of simplicity in equipment required. Preferably, the diluent is a gas, is burnable, and will contribute as a fuel. Dilution of the primary fuel component leads, however, to the problem of inconsistency of composition in both liquid and gas phases as gas is withdrawn from the storage means.

It is an object of the present invention to provide a fuel composition having a relatively high flame temperature when burned as a gas.

It is a further object of the present invention to provide a fuel composition which will have a relatively high weight per unit volume of shipping space.

It is another object of the present invention to provide a fuel composition having a relatively low operational cost.

It is still another object of the present invention to provide a fuel composition which is relatively safe in storage, transportation and use.

It is yet another object of the present invention to provide a fuel composition having a relatively uniform primary fuel component concentration in the gas phase.

We have discovered a fuel composition which retains relatively uniform concentration of primary fuel gas over the full range of withdrawal of gas from the cylinder up to maximum withdrawal. Usage of the term "maximum withdrawal" in the present specification means removal of about 95 percent of the fuel mixture orignally charged to the container.

Our fuel composition, when burned as a gas, has excellent flame temperature properties, is easier to light and sustains flame better and at a higher temperature than commercial propane, cuts faster than acetylene, uses about the same or less oxygen than acetylene, and uses much less oxygen than propane. Our fuel composition is easily and safely storable at pressures up to the storage vessel limit and temperatures as high as about 90 degrees centigrade. Ordinarily, our gas is stored at the pressure required to liquefy and maintain it as a liquid. Further, our fuel may be burned as a gas at pressures up to the full storage pressure, in contrast to acetylene which must be valved down to about 15 pounds per square inch gauge for use.

In addition, our fuel gas has substantial advantages over acetylene in storage and transportation. Our gas may be liquefied under pressure and shipped in conventional cylinders, in tank cars or trucks, or in any suitable bulk transport media. This is not possible with acetylene which must be dissolved in acetone and transported in a packed cylinder. Because of the acetone and packing, a standard cylinder of acetylene weighs about 240 pounds. Of this, only about 20 pounds is actually acetylene. In contrast, a full cylinder of about the same size containing our fuel gas weighs about 110 pounds, of which 60 pounds are fuel. Thus, considerably more of our fuel gas may be stored or transported per unit volume of available space.

Primary fuel in the composition of the present invention is methylacetylene, propadiene, or mixtures thereof. When methyl acetylene and/or propadiene are present in excess of about 78 percent in either the gas or the liquid phase, a possibility of explosion exists. Thus, when methyl acetylene (hereinafter referred to as MA) or propadiene (hereinafter referred to as PPD) are stored under pressure, a diluent gas is necessary to reduce the explosion hazard. An effective upper limit of total MA and PPD content of the fuel in gas or liquid phase, then, is about 75 percent.

When the percentage of primary fuel (MA and/or PPD) in the gas phase is less than about 48 mole percent, the heating value of the fuel gas approaches that of the diluent gas or gases. Thus, the lowest desirable primary fuel content in the gas phase at any time during withdrawal of fuel from storage is about 48 mole percent, with a primary fuel content of about 60 percent or more being preferred.

From the above discussion it becomes apparent that the primary fuel content of the gas phase should be from about 48 to about 75 mole percent and preferably from about 60 to about 75 mole percent.

The balance of the fuel consists essentially of two diluent constituents, a first diluent constituent of propane, and/or propylene, and a second diluent constituent of saturated and/or ethylenically unsaturated hydrocarbons containing four carbon atoms.

Appropriate four carbon hydrocarbons for use in the composition of the present invention are; n-butane, isobutane, butene-1, butene-2, butadiene, iso-butene, and mixtures thereof.

Preferred concentrations of propylene, and/or propane, will generally range from about 11 to about 38 mole percent of the total fuel composition. When less than 11 mole percent is used, the concentrations of primary fuel in the initially withdrawn gas will usually be above the preferred upper limit. Use of more than 38 mole percent will usually result in a gas composition initially lower in primary fuel than the preferred minimum limit, but increasing in primary fuel composition as withdrawal of gas from over the liquid proceeds, until the concentration of primary fuel will exceed the preferred maximum limit in the gas.

Preferred concentrations of four carbon hydrocarbons will generally range from about 2 to about 14 mole percent of the fuel mixture. If less than 2 mole percent is present initially, there will usually be insufficient four carbon hydrocarbons remaining after about 50 percent withdrawal so that the primary fuel concentration will exceed the preferred maximum limit. When more than 14 mole percent is present, the concentration of primary fuel in the gas will decrease as withdrawal proceeds until its concentration is less than the preferred minimum.

Thus, a fuel mixture in accordance with the present invention consists essentially of a mixture of from about 48 to about 75 mole percent of a first component selected from the group consisting of methyl acetylene and propadiene, from about 11 to about 38 mole percent of a second component selected from the group consisting of propane and propylene, and from about 2 to about 14 mole percent of a third component selected from the group consisting of saturated and ethylenically unsaturated hydrocarbons containing four carbon atoms.

In use, the fuel gas of this invention may be handled in much the same manner as conventional gases with some minor adjustments in technique to accommodate the generally higher flame temperatures obtainable.

In order to provide ease in understanding, the following examples are set forth to illustrate, and are not to be construed to limit the present invention.

*Example I (Comparative)*

When a mixture of about 30 mole percent methylacetylene, about 35 mole percent propadiene, and about 35 mole percent propylene is liquefied and the gas phase incrementally withdrawn therefrom, it will be found that at about 95% withdrawal of the material as a gas the concentration of methylacetylene and propadiene in the remaining liquid phase will exceed 96 mole percent (a sensitively explosive mixture). Thus, this combination is not suitable for use in accordance with the present invention.

*Example II (Comparative)*

A liquefied mixture substantially the same as in Example I, but with propane substituted for propylene, will exhibit a liquid phase concentration of methylacetylene and propadiene of about 92 mole percent after about 95 percent withdrawal. This combination is therefore not suitable for use in accordance with the present invention.

*Example III (Comparative)*

A mixture of about 35 mole percent propadiene, about 30 mole percent methylacetylene, and about 35 mole percent butadiene, when liquefied for storage, will have a concentration in the gas phase of less than about 27 mole percent methylacetylene and propadiene after withdrawal of about 95 percent. Since the concentration of methylacetylene and propadiene drops well below the effective lower limit (48 mole percent), the primary fuel becomes effectively butadiene and flame efficiency drops correspondingly.

*Example IV (Comparative)*

A liquefied mixture substantially the same as in Example III, but with isobutene substituted for butadiene will exhibit a gas phase concentration of methylacetylene and propadiene of about 31 mole percent after withdrawal of about 95 perecnt and is objectionable for the reason (lowered flame efficiency) set forth in Example III.

*Example V*

A liquefied mixture of about 65 mole percent propadiene, about 10 mole percent n-butene, and about 25 mole percent propane will have a concentration of propadiene, in both the gas and liquid phases, substantially within the preferred limits of the present invention throughout withdrawal. In use, flame temperatures are excellent and cutting speeds are faster than those of either acetylene or propane.

*Example VI*

A liquefied mixture of about 65 mole percent propadiene, about 10 mole percent isobutene, and about 25 mole percent propylene will perform in substantially the same manner as the mixture of Example V and is therefore operable in accordance with the present invention.

*Example VII*

A liquefied mixture of about 65 mole percent propadiene, about 10 mole percent isobutene, and about 25 percent propane will perform in substantially the same manner as the mixture of Example V and is therefore operable in accordance with the present invention.

*Example VIII*

A liquefied mixture of about 65 mole percent propadiene, about 25 mole percent propylene, and about 10 mole percent 1-butene will perform in substantially the same manner as the mixture of Example V and is therefore operable in accordance with the present invention.

*Example IX*

A liquefied mixture of about 65 mole percent propadiene, about 25 mole percent propylene, and about 10 percent n-butane will perform in substantially the same manner as the mixture of Example V and is therefore operable in accordance with the present invention.

*Example X*

A liquefied mixture of about 65 mole percent propadiene, about 25 mole percent propane, and about 10 mole percent isobutane will perform in substantially the same manner as the mixture of Example V and is therefore operable in accordance with the present invention.

*Example XI*

A liquefied mixture of about 65 mole percent methylacetylene, about 25 mole percent propane, and about 10 mole percent n-butene will maintain a concentration of methylacetylene substantially within the preferred limits of the present invention throughout withdrawal. In use, flame temperatures are excellent and cutting speeds are faster than those of acetylene or propane.

*Example XII*

A liquefied mixture of about 65 mole percent methylacetylene, about 25 mole percent propane, and about 10 mole percent isobutene will perform in substantially the same manner as the mixture of Example XI and is therefore operable in accordance with the present invention.

*Example XIII*

A liquefied mixture of about 65 mole percent methylacetylene, about 25 mole percent propylene, and about 10 mole percent isobutene will perform in substantially the same manner as the mixture of Example XI and is therefore operable in accordance with the present invention.

*Example XIV*

A liquefied mixture of about 65 mole percent methylacetylene, about 25 mole percent propane, and about 10 mole percent n-butane will perform in substantially the same manner as the mixture of Example XI and is therefore operable in accordance with the present invention.

*Example XV*

A liquefied mixture of about 35 mole percent propadiene, about 30 mole percent methylacetylene, about 25 mole percent propane, and about 10 mole percent isobutane will maintain a concentration of propadiene-methylacetylene substantially within the limits of the present invention. In use, flame temperatures are excellent and cutting speeds are faster than those of acetylene or propane.

*Example XVI*

A liquefied mixture of about 35 mole percent propadiene, about 30 mole percent methylacetylene, about 30 mole percent propane, and about 5 percent isobutane will perform in substantially the same manner as the mixture of Example XV and is therefore operable in accordance with the present invention.

*Example XVII*

A liquefied mixture of about 40 mole percent propadiene, about 25 mole percent methylacetylene, about 30 mole percent propane, and about 5 mole percent 1,3-butadiene will perform in substantially the same manner as the mixture of Example XV and is therefore operable in accordance with the present invention.

*Example XVIII*

A liquefied mixture of about 25 mole percent propadiene, about 40 mole percent methylacetylene, about 30 mole percent propane, and about 4 mole percent 1,3-butadiene will perform in substantially the same manner as the mixture of Example XV and is therefore operable in accordance with the present invention.

*Example XIX*

A liquefied mixture of about 40 mole percent propadiene, about 28 mole percent methylacetylene, about 20 mole percent propane, about 8 mole percent propylene, and about 4 mole percent n-butane, will perform in substantially the same manner as the mixture of Example XV and is therefore operable in accordance with the present invention.

*Example XX*

A liquefied mixture of about 40 mole percent propadiene, about 25 mole percent methylacetylene, about 20 mole percent propane, about 5 mole percent propylene, about 2 mole percent n-butane, about 2 mole percent 1-butene, about 2 mole percent isobutene, about 2 mole percent 1,3-butadiene, and about 2 mole percent isobutane will perform in substantially the same manner as the mixture of Example XV and is therefore operable in accordance with the present invention.

*Example XXI*

A liquefied mixture of about 69 mole percent methylacetylene and propadiene, about 13 mole percent propane, about 13 mole percent propylene, and about 5 mole percent of a mixture of four carbon hydrocarbons will perform in substantially the same manner as the mixture of Example XI and is therefore operable in accordance with the present invention.

Various modifications may be made in the present invention without departing from the spirit or scope thereof, and it is to be understood that we limit ourselves only as defined in the appended claims.

We claim:

1. A composition of matter consisting essentially of a mixture of from about 48 to about 75 mole percent of a first component selected from the group consisting of methylacetylene, propadiene and mixtures thereof, from about 11 to about 38 mole percent of a second component selected from the group consisting of propane, propylene and mixtures thereof, and from about 2 to about 14 mole percent of a third component selected from at least one member of the group consisting of saturated and ethylenically unsaturated hydrocarbons containing four carbon atoms.

2. A composition of matter consisting essentially of a mixture of from about 60 to about 75 mole percent of a first component selected from the group consisting of methylacetylene, propadiene and mixtures thereof, from about 11 to about 38 mole percent of a second component selected from the group consisting of propane, propylene and mixtures thereof, and from about 2 to about 14 mole percent of a third component selected from at least one member of the group consisting of saturated and ethylenically unsaturated hydrocarbons containing four carbon atoms.

3. A composition of matter consisting essentially of a mixture of about 65 mole percent propadiene, about 10 mole percent n-butene, and about 25 mole percent propane.

4. A composition of matter consisting essentially of a mixture of about 65 mole percent propadiene, about 10 mole percent isobutene, and about 25 mole percent propylene.

5. A composition of matter consisting essentially of a mixture of about 65 mole percent propadiene, about 10 mole percent isobutene, and about 25 mole percent propane.

6. A composition of matter consisting essentially of a mixture of about 65 mole percent propadiene, about 25 mole percent propylene, and about 10 mole percent 1-butene.

7. A composition of matter consisting essentially of a mixture of about 65 mole percent propadiene, about 25 mole percent propylene, and about 10 mole percent n-butane.

8. A composition of matter consisting essentially of a mixture of about 65 mole percent propadiene, about 25 mole percent propane, and about 10 mole percent isobutane.

9. A composition of matter consisting essentially of a mixture of about 65 mole percent methylacetylene, about 25 mole percent propane, and about 10 mole percent n-butene.

10. A composition of matter consisting essentially of a mixture of about 65 mole percent methylacetylene, about 25 mole percent propane, and about 10 mole percent isobutene.

11. A composition of matter consisting essentially of a mixture of about 65 mole percent methylacetylene, about 25 mole percent propylene, and about 10 mole percent isobutene.

12. A composition of matter consisting essentially of a mixture of about 65 mole percent methylacetylene, about 25 mole percent propane, and about 10 mole percent n-butane.

13. A composition of matter consisting essentially of a mixture of about 35 mole percent propadiene, about 30 mole percent methylacetylene, about 25 mole percent propane, and about 10 mole percent isobutane.

14. A composition of matter consisting essentially of a mixture of about 35 mole percent propadiene, about 30 mole percent methylacetylene, about 30 mole percent propane, and about 5 mole percent isobutane.

15. A composition of matter consisting essentially of a mixture of about 40 mole percent propadiene, about 25 mole percent methylacetylene, about 30 mole percent propane, and about 5 mole percent 1,3-butadiene.

16. A composition of matter consisting essentially of a mixture of about 25 mole percent propadiene, about 40 mole percent methylacetylene, about 30 mole percent propane, and about 5 mole percent 1,3-butadiene.

17. A composition of matter consisting essentially of a mixture of about 40 mole percent propadiene, about 28 mole percent methylacetylene, about 20 mole percent propane, about 8 mole percent propylene, and about 4 mole percent n-butane.

18. A composition of matter consisting essentially of a mixture of about 40 mole percent propadiene, about 25 mole percent methylacetylene, about 20 mole percent propane, about 5 mole percent propylene, about 2 mole percent n-butane, about 2 mole percent 1-butene, about 2 mole percent isobutene, about 2 mole percent 1,3-butadiene, and about 2 mole percent isobutane.

19. A composition of matter consisting essentially of a mixture of about 69 mole percent methylacetylene and propadine, about 13 mole percent propane, about 13 mole percent propylene, and about 5 mole percent of a mixture of four carbon hydrocarbons.

References Cited by the Examiner

UNITED STATES PATENTS

| 1,528,766 | 3/1925 | Harris. | |
| 1,673,620 | 6/1928 | Muller-Cunradi | 44—52 |

FOREIGN PATENTS 630,221  10/1949  Great Britain.

MORRIS O. WOLK, *Primary Examiner.*
DELBERT E. GANTZ, *Examiner.*